United States Patent Office 3,325,249
Patented June 13, 1967

3,325,249
SILICA PIGMENTS AND PREPARATION THEREOF
Oliver W. Burke, Jr., 506 Intracoastal Drive, Fort Lauderdale, Fla. 33304, and Carey B. Jackson, Pompano Beach, Fla.; said Jackson assignor to said Burke
No Drawing. Filed Dec. 30, 1964, Ser. No. 422,454
17 Claims. (Cl. 23—182)

This invention relates to silica pigment materials and to the preparation thereof from alkali silicate, and aims generally to improve the same.

This application is a continuation-in-part of our co-pending application S.N. 142,661, filed Oct. 3, 1961, and entitled "Silica Pigments and Preparation Thereof," and of our copending application S.N. 142,496, filed Oct. 3, 1961, entitled "Silica Pigments and Preparation Thereof," both abandoned after the filing of this application.

OBJECTS

Particular objects of the present invention, severally and interdependently, are to provide an improved process for the preparation of silica pigments; to provide a process for controlling the relative sizes of the primary particles of colloidal silica and of the aggregates and flocs thereof which form the silica pigment particles, e.g. for the production of improved silica pigment materials; and to provide an improved silica pigment having useful characteristics and at an economical cost.

Other objects and advantages of the invention will be apparent from a consideration of the herein set forth general and specific description of illustrative embodiments thereof.

PRESENT INVENTION—IN GENERAL

The present invention is concerned with the production of silica pigment by the acidulation of alkali metal silicate e.g. sodium silicate, especially with carbon dioxide as acidulating agent, and is characterized by the addition, at certain predetermined stages during the progress of the acidulation, of one or more members of a particular class of non-acidulating electrolytes.

The course of the acidulation of sodium silicate solution to precipitate silica therefrom can be classified in several distinct stages. Prior to acidulation, of course, is the preparatory stage in which the sodium silicate is diluted with water and in which the factor $x$ designating the ratio of $SiO_2$ to $Na_2O$ in the sodium silicate formula $Na_2O(SiO_2)_x$ remains unchanged. As a practical matter, in commercial sodium silicate used for the production of precipitated silica, the value of $x$ lies in the range of about 3.0 to 3.4, e.g. 3.22 in the 41° Bé. sodium silicate of commerce.

The *first period* in the acidulation we call the pre-precipitation period, during which the silica of solution is polymerizing to form colloidal particles, that is, the primary silica particles also sometimes called the ultimate silica particles. In this period, no appreciable number of colloidal silica particles have aggregated to form silica network particles. The end of this period we consider extends to a point at which the $x$ value lies in the range of 4.2 to 5.3 (depending on the conditions present). The present invention aims to provide a method of controlling the size of the colloidal particles produced in the first stage in relation to the size of network particles formed in the second stage.

The *second period* we term the incipient precipitation period. This period embraces a region in which the colloidal silica particles aggregate to from network particles, and is detectable by the appearance of Tyndall effect, which usually occurs between $x$ values of 4.2 and 5.3.

The term Tyndall effect is used herein in the same manner as defined in J. Thewlis' Encyclopaedic Dictionary of Physics, Pergamon Press, 1962, in which it is defined as follows:

"*Tyndall effect*.—The scattering of light by very small particles, the scattered light being predominantly blue."

This authority further states that:

"This phenomenon and its dependence on the size of the scattering particles was first investigated by Tyndall. The scattered intensity is proportional to the square of the volume of the particle and proportional to $1/\lambda^4$. Thus the scattering for light at the blue end of the spectrum is about ten times as great as for light at the red end."

Under appropriate conditions the appearance of the Tyndall effect may mark the commencement of the second stage. This second or incipient precipitation period continues to the point where precipitation of silica commences and preferably less than 10% of the silica has appeared as precipitate. This incipient precipitation preiod we consider to extend from the point at which $x$ has a value of between 4.2 and 5.3 to an $x$ value of about 6.4 or higher (depending on the conditions present). The present invention aims to provide a method of controlling the size of the network particles formed in the second stage independent of the size of the primary particles formed in the first stage.

The *third period* or the principal precipitation period of the acidulation is that period in which the major part of the precipitation of silica occurs and extends from the upper end of the second period when the precipitation of silica is commencing to the point at which the precipitation of silica is substantially complete, which is normally considered to be the point at which about 70% of the stoichiometric quantity of acidulating agent has been added and at which $x$ has a value of about 10 or more (which value may also vary with the conditions present). Depending on the conditions present, the extent of flocculation of the precipitate may vary. The present invention contemplates a method of adjusting such conditions to effect adequate flocculation, which facilitates filtration.

By the present invention, we have discovered that particular advantage is attained by a process for the precipitation of reinforcing silica pigment by the gradual acidulation of an aqueous solution of alkali metal silicate, especially sodium silicate, with the aid of carbon dioxide, accompanied by a timed or progressive addition of non-acidulating electrolyte in an amount in the range of 0.01 to 1.0 mole per mole of silica present (as $SiO_2$), which non-acidulating electrolyte preferably increases the concentration of alkali metal ion, e.g. sodium ion, and also preferably decreases the concentration of silica, in the solution. The non-acidulating electrolyte employed is from the class of alkali metal salts other than the alkali metal carbonates. Such salts may be added dry, but preferably are added in aqueous solution in concentrations between the concentration of saturation and 1% by weight. Non-acidulating electrolytes which can be used include the alkali metal salts of mineral acids, including halogen acids, especially sodium chloride and sodium sulphate, sodium chloride being preferred. Such non-acidulating electrolytes are preferably used in aqueous solution having a greater normality than the alkali metal silicate solution.

In a first embodiment of the invention the said non-acidulating electrolyte is gradually added to the aqueous solution of sodium silicate at least during a part of the period in the acidulation thereof in which the value of $x$ in the composition of the sodium silicate designated by the formula $Na_2O(SiO_2)_x$ is changing from 3.75 to between 4.2 and 5.3 and preferably prior to the appearance of the Tyndall effect. By this embodiment it is possible to produce in the first stage of acidulation ultimate or primary silica particles of controlled size depending on the period of progressive introduction of the non-acidulating electrolyte and the concentration and quantity thereof.

In a second embodiment of the invention, non-acidulating electrolyte is added after an $x$-value of at least about 4.2 is reached, and preferably only when the Tyndall effect has become evident. By this embodiment it is possible to control the size of the primary particles formed in the first stage essentially either by the control of the concentration and temperature and rate of acidulation of the aqueous sodium silicate solution alone, or with a measured quantity of electrolyte, and to then increase the concentration of alkali metal ion relative to the silica content during the aggregation stage to thus increase the size of the network particles in relation to the size of the primary particles.

In a third embodiment of the invention, non-acidulating electrolyte is added after the precipitation of silica pigment is substantially complete. By this third embodiment it is possible to control the size of the primary particles and the size of the network particles as aforesaid, and to then increase the sodium ion concentration, which we have found to hasten the completion of precipitation and to increase the degree of flocculation of the precipitate, which facilitates the recovery of the pigment by washing and filtration.

In a fourth embodiment of the invention, the procedures of selected ones of the first, second and third embodiments are combined, with or without variation in the concentration of the electrolyte solution being added, so that a predetermined part of the increase of sodium ion concentration desired in the later stages of the acidulation may be employed in the earlier stages thereof.

In short, we have found that by applications of the present invention we can vary the size of the ultimate or primary particles relative to the size of the network aggregates thereof constituting the pigment particles, independently, and that by other applications of the invention we can vary the size of the flocs of network aggregates relative to the size of the network aggregates or pigment particles themselves, thus to facilitate filtration or prepare flocs well adapted for dispersion of the silica pigment to the extent required in the situs of use thereof.

The present invention may be applied in the acidulation of alkali metal silicate solutions having concentrations of alkali metal silicate—designated by the formula $M_2O(SiO_2)_x$ in which M is alkali metal—in the range of about 20 grams per liter to about 200 grams per liter, and being subjected to acidulation at temperatures between the freezing point and boiling point of water, i.e. from about 5° C. to about 100° C. at atmospheric pressure, or up to 200° C. or more if conducted under higher pressures.

After the flocs of precipitated silica pigment have been formed they may be recovered from the mother liquor in any suitable or preferred manner, and may be used per se, or be subjected to after treatments appropriate for their intended use.

The carbon dioxide gas employed in this invention may be full strength or may be diluted with air or other inert gases, e.g. such as the dilute carbon dioxide gas produced by the combustion of hydrocarbons such as propane or butane.

The rate of introduction of the carbon dioxide gas establishes the rate of acidulation of the sodium silicate and this rate may vary from the maximum rate of absorption of carbon dioxide by the sodium silicate solution to rates one-tenth or even as slow as one-hundreth of this maximum absorption rate. Application Ser. No. 422,144, now Patent No. 3,250,594, issued May 10, 1966, discloses the advantages of varying the rate of acidulation of sodium silicate with carbon dioxide during certain stages of the acidulation and these findings can be employed in conjunction with the teachings of this invention.

The process of this invention may be conducted in a batchwise or stepwise manner, or continuously, depending on available equipment. Suitable apparatus, for example, is set forth in our copending application S.N. 142,668, now Patent No. 3,256,068, issued June 14, 1966, in which, for example, the present invention can be practiced as a continuous process wherein the acidulation is applied to moieties of the alkali-metal silicate solution in a series of zones, preferably coordinated with the periods of addition or non-addition of electrolyte, with the addition of the electrolyte effected in one of said zones, or in a number of said zones less than all of said zones, in accordance with the correlations of electrolyte additions and acidification of the solution contemplated by the present invention.

After the silica pigment has been precipitated with the aid of carbon dioxide and non-acidulating electrolyte the silica product may be recovered from the mother liquor in any suitable way, e.g. by centrifuging, filtering, etc. and the silica pigment material may be removed as wet cake for further use with or without any further after-treatment.

In the examples herein, like after-treatments are employed in each of the examples of the respective series set out to exemplify the invention and its advantages, but the particular after-treatments are not claimed herein, and the novel ones thereof are claimed in other applications.

The silica product as wet filter or centrifuge cake may be master-batched with latices of natural or synthetic elastomers and/or plastomers.

The process may be conducted in a batchwise or stepwise manner, or continuously, depending on selected equipment.

The novel features of the invention are set forth in the claims appended hereto, but the practice of the invention itself will be more precisely understood by reference to the following specific examples embodying the same, which are to be considered as illustrative and not restrictive of the invention.

*Example 1*

In this example 2000 ml. of 41° Bé. commercial sodium silicate containing 4 moles of $Na_2O(SiO_2)_{3.22}$ was diluted with 12 liters of water and was placed in a closed pressure vessel with paddle agitator running at moderate speed. Then gradually to the vessel while stirring was added 8 moles (467.6 g.) of sodium chloride dissolved in 4 liters of water and 4.8 moles (211.2 g.) of carbon dioxide. In Table II the rates of addition of aqueous sodium chloride solution and carbon dioxide gas are set forth.

TABLE II

| Time Cumulative (minutes) | Sodium Chloride Cumulative (moles) | Carbon Dioxide Cumulative (moles) |
|---|---|---|
| 10 | 1.0 | 0.06 |
| 40 | 1.68 | 0.54 |
| 70 | 1.88 | 0.68 |
| 130 | 2.20 | 0.80 |
| [1] 145 | 2.20 | 0.91 |
| 175 | 3.20 | 1.00 |
| 205 | 4.00 | 1.06 |
| 235 | 4.60 | 1.08 |
| 280 | 6.20 | 1.08 |
| 295 | 8.00 | 1.10 |
| 340 | ---------- | 1.11 |
| 370 | ---------- | 1.15 |
| 385 | ---------- | 1.22 |
| 400 | ---------- | 1.30 |
| 445 | ---------- | 1.40 |
| 490 | ---------- | 1.90 |
| 505 | ---------- | 2.52 |
| 510 | ---------- | 4.35 |
| 513 | ---------- | 4.80 |

[1] Initial precipitation of silica.

The silica precipitate was filtered and washed with water and the filter cake divided into portions.

A first portion of this filter cake was further water washed, filtered, dried in an oven at 105° C., ground, screened through a 150 mesh screen and this product was designated "silica 1–A."

A second portion of said filter cake was further water washed and acidified with 2 N hydrochloric acid until acid to methyl orange then sufficient sodium carbonate was added to make the precipitate just alkaline to methyl orange then the precipitate was filtered, washed and dried in an oven at 105° C., ground and screened through a 150 mesh screen and this product was designated as "silica 1–B."

A third portion of the filter cake was treated in the same manner as "silica 1–B" heretofore, except that said precipitate was slurried in water and boiled for ½ hour and then was made acid to methyl orange and then sufficient sodium carbonate was added to make said precipitate just alkaline to methyl orange. The filtered, washed, dried and ground product was designated as "silica 1–C."

The silica filler materials designated 1–A, 1–B and 1–C were each compounded with a butadiene-styrene elastomer (SBR–1500) according to the compounding recipe set forth in Table III hereof.

TABLE III

| Compound ingredients: | Quantities (wt. parts) |
|---|---|
| Butadiene-styrene copolymer [1] | 100.0 |
| Silica pigment material | 58.5 |
| Antioxidant, 2,2 - methylene - bis(4-methyl-6-t.-butylphenol [2] | 2.0 |
| Triethanolamine | 1.0 |
| Paracoumarone-indene resin [3] | 10.0 |
| Stearic acid | 3.0 |
| Zinc oxide | 5.0 |
| Di-2-benzothiazyl disulphide [4] | 1.25 |
| N,N'-di-o-tolylguanidine [5] | 1.75 |
| Sulfur | 3.0 |

[1] SBR–1500.
[2] Antioxidant 2246, a trademark product of American Cyanamid Co.
[3] Cumar Resin RH, a trademark product of Allied Chemical Corp.
[4] Altax, a trademark product of R. T. Vanderbilt Co., Inc.
[5] DOTG, a trademark product of American Cyanamid Co.

In compounding the stock the selected silica pigment material was milled into the SBR–1500 together with the antioxidant and triethanolamine and the stocks aged overnight, and then milled with the remaining compounding ingredients and cured for 45 minutes at 287° F.

The physical test data for the respective vulcanizates containing the foregoing silica pigment is set forth in Table IV hereof.

TABLE IV

| Silica Tested (in vulcanizate) | Tensile (p.s.i.) | Elongation (Percent) | Modulus (300%) | Hardness (Shore A) |
|---|---|---|---|---|
| 1–A | 1,620 | 475 | 705 | 61 |
| 1–B | 2,755 | 475 | 1,505 | 69 |
| 1–C | 2,500 | 450 | 1,400 | 67 |

*Example 2*

To a stainless steel reactor agitated by a propeller stirrer was added 77 liters of water and 14,065 grams (20 moles $Na_2O(SiO_2)_{3.22}$) of 41° Bé. commercial sodium silicate. The agitator was started and the dilute sodium silicate solution thoroughly mixed and its temperature raised to 80° C.

The carbon dioxide was introduced through a tube leading to the bottom of the reactor.

The electrolyte solution was prepared by dissolving 5 moles of sodium chloride in 1 liter of water. The sodium chloride solution was placed in a graduated container with a tube leading to the reactor. The sodium chloride solution flowing at a constant rate was introduced to the silica reaction vessel over a period of 110 minutes. Concurrently therewith, a flow of carbon dioxide gas was introduced into the reaction vessel, at a constant rate as was indicated by a flowmeter. During the first 110 minutes 6.2 moles of carbon dioxide were introduced. This meant that the degree of acidulation of the sodium silicate solution was 31% and a blue color of the Tyndall effect was observed.

At 195 minutes or about 85 minutes after the appearance of the Tyndall effect the precipitation of silica commenced.

The carbon dioxide flow to the reaction vessel was continued at a rate of 1 mole in about 18 minutes and by 366 minutes 20 moles of carbon dioxide had been introduced. Before terminating the reaction another 5.8 moles of carbon dioxide were introduced. See Table V for the rates of acidulation.

The reactor was cooled and the silica slurry was pumped into a filter where it was filtered and washed until the soluble salt content was in the range of 1 to 2%.

The silica filter cake was then slurried with water treated with dilute sulfuric acid until the pH was 4.5 and the product was filtered, dried and micropulverized.

TABLE V.—SILICA PREPARATION FROM $Na_2O(SiO_2)_{3.22}$ (20 MOLES) AT 80° C.

| Time Cumulative (minutes) | Sodium Chloride Cumulative (moles) | Carbon Dioxide Cumulative (moles) |
|---|---|---|
| 0 | 0 | 0 |
| 30 | 1.4 | 1.7 |
| 60 | 2.7 | 3.4 |
| 90 | 4.1 | 4.9 |
| [1] 110 | 5 | 6.2 |
| 150 | ------------ | 8.4 |
| 180 | ------------ | 9.9 |
| [2] 195 | ------------ | 10.5 |
| 240 | ------------ | 13.1 |
| 270 | ------------ | 14.6 |
| 300 | ------------ | 16.3 |
| 330 | ------------ | 18.0 |
| 366 | ------------ | 20.0 |
| 390 | ------------ | 21.5 |
| 420 | ------------ | 22.8 |
| 441 | ------------ | 23.2 |
| 465 | ------------ | 25.8 |

[1] Initial Tyndall effect.
[2] Beginning of silica precipitation.

*Example 3*

This example was carried out in a manner similar to Example 2 except that the non-acidulating electrolyte was added at once after that period in the acidulation of sodium silicate with carbon dioxide when the Tyndall effect first became noticeable.

In this example 14,065 grams (20 moles $Na_2O(SiO)_{3.22}$)

of 41° Bé. commercial sodium silicate was dissolved in 77 liters of water and placed in a stainless steel reactor agitated by a propeller type stirrer. The reactor and sodium silicate solution were heated to 80° C. and so maintained.

Through a tube reaching to the bottom of the reactor carbon dioxide was allowed to flow into the agitated sodium silicate solution at a relatively constant rate so that after 126 minutes 7.1 moles of carbon dioxide had been introduced and the sodium silicate solution took on the blue Tyndall effect color.

The non-acidulating electrolyte solution, which had been prepared by dissolving 5 moles of sodium chloride in one liter of water, was now added to the partially acidulated sodium silicate. The flow of carbon dioxide was continued at the same relatively constant rate (see Table VI). After a total reaction time of 186 minutes a total of 10.4 moles of carbon dioxide had been added and the precipitation of silica had commenced. After 425 minutes 24 moles of carbon dioxide had been added, and the reaction was terminated. See Table VI for details of rates of addition of carbon dioxide.

The silica material was cooled, filtered and washed until the soluble salt content was in the range of 1 to 2% by weight (based on silica).

The washed silica material was treated with sulfuric acid until a pH of 4.5 was attained. The resulting silica product was filtered and washed, then dried at 105° C. and micropulverized.

TABLE VI.—SILICA PREPARATION $Na_2O(SiO_2)_{3.22}$ (20 MOLES AT 80° C.)

| Time Cumulative (minutes) | Sodium Chloride (moles) | Carbon Dioxide Cumulative (moles) |
|---|---|---|
| 0 | | 0 |
| 30 | | 1.7 |
| 60 | | 3.3 |
| 90 | | 5.0 |
| 120 | | 6.7 |
| 1 126 | 5 | 7.1 |
| 150 | | 8.4 |
| 180 | | 10.0 |
| 2 186 | | 10.4 |
| 210 | | 11.7 |
| 240 | | 13.4 |
| 270 | | 15.0 |
| 300 | | 16.7 |
| 330 | | 18.4 |
| 360 | | 20.0 |
| 390 | | 21.8 |
| 420 | | 23.4 |
| 425 | | 24.0 |

1 Initial Tyndall effect.
2 Commencement of silica precipitation.

*Example 4 (comparative example)*

This comparative example was made in a manner exactly like Examples 2 and 3 except that the 1 liter of water containing 5 moles of sodium chloride was added initially to the 14,065 grams (20 moles $Na_2O(SiO_2)_{3.22}$) of commercial 41° Bé. silicate dissolved in 77 liters of water. After the sodium chloride electrolyte and the dilute sodium silicate solutions were thoroughly mixed, the reactor was heated to 80° C. and while maintaining the reactor contents at 80° C. carbon dioxide was introduced at the same rate as employed in Examples 2 and 3, i.e. one mole of carbon dioxide about every 18 minutes. At the end of 455 minutes the acidulation had progressed to about 120% and the reaction was terminated. For the rates of acidulation see Table VII. As in Examples 2 and 3, the product was treated with sulfuric acid to a pH below 5 and filtered, dried and micropulverized.

TABLE VII.—SILICA PREPARATION FROM $Na_2O(SiO_2)_{3.22}$ (20 MOLES) AT 80° C.

| Time Cumulative (minutes) | Sodium Chloride (moles) | Carbon Dioxide Cumulative (moles) |
|---|---|---|
| 0 | 5 | 0 |
| 40 | | 2.0 |
| 80 | | 4.2 |
| 1 100 | | 5.3 |
| 120 | | 6.1 |
| 160 | | 8.3 |
| 2 194 | | 10.0 |
| 200 | | 10.5 |
| 240 | | 12.7 |
| 280 | | 14.7 |
| 320 | | 16.8 |
| 360 | | 18.8 |
| 380 | | 20.2 |
| 400 | | 21.5 |
| 440 | | 23.3 |
| 460 | | 24.2 |

1 Initial Tyndall effect.
2 Beginning of silica precipipation.

The silicas of Examples 2, 3, and comparative Example 4 were each compounded with SBR–1502 in accordance with the compounding recipe given in Table VIII. From the physical test results set forth in Table IX it is seen that the silicas of Example 2 and 3 were improvements over the silica of comparative Example 4.

TABLE VIII

| Compound ingredients: | Quantities (wt. parts) |
|---|---|
| Butadiene-styrene copolymer (SBR–1502) | 100 |
| Silica pigment material | 50 |
| Antioxidant, 2,2-methylene-bis (4-methyl-6-t.-butylphenol) (Antioxidant 2246) | 2.0 |
| Triethanolamine | 1.0 |
| Paracoumarone-indene resin (Cumar MH 2½) | 2.5 |
| Reogen | 5.0 |
| Zinc oxide | — |
| Magnesium oxide | 4.0 |
| Di-2-benzothiazyl disulphide (Altax) | 0.75 |
| N,N'-di-o-tolyguanidine (DOTG) | 1.5 |
| Sulfur | 2.0 |

TABLE IX.—COMPARATIVE EVALUATION

| Example No | 2 | 3 | Comparative 4 |
|---|---|---|---|
| x value when electrolyte added | 3.22–4.7 (Range) | 5.0 | 3.22 |
| x value when Tyndall effect appeared | 4.7 | 5.0 | 4.4 |
| x value when precipitate appeared | 6.8 | 6.8 | 6.5 |
| Bulk density of micropulverized silica (g./ml.) | 0.116 | 0.176 | 0.132 |
| Vulcanizate Compound No. AR– | 2468 | 2467 | 2453 |
| Physical data: | | | |
| Hardness (Shore A) | 62 | 70 | 65 |
| Modulus 300% (p.s.i.) | 695 | 600 | 870 |
| Tensile at Break (p.s.i.) | 3,970 | 4,355 | 3,415 |
| Elongation at Break (percent) | 710 | 765 | 620 |

In compounding the stock the selected silica pigment material was milled into the SBR–1502 together with the anti-oxidant and other compounding ingredients and the stock was aged overnight and then remilled and cured for 120 minutes at 287° F.

*Example 5*

To a stainless steel reactor agitated with a propeller type agitator, was added 76 liters of water and 14,065 grams (20 moles $Na_2O(SiO_2)_{3.22}$) of commercial 41 Bé. sodium silicate. The agitator was started and the sodium silicate and water thoroughly mixed. The temperature was raised to 80° C. and so maintained.

The electrolyte solution was prepared by dissolving 10 moles of sodium chloride or 292 grams of sodium chloride in 2 liters of water.

The carbon dioxide was introduced to the reaction vessel by a tube leading to the bottom thereof. The rate of carbon dioxide feed to the reactor was 1 mole in about 18 minutes.

The sodium chloride electrolyte solution was fed to the reaction vessel at a relatively constant rate, it taking 120 minutes to feed in the 10 moles of sodium chloride solution. Concurrently with the feeding of the sodium chloride solution, carbon dioxide was introduced at a relatively constant rate and after 120 minutes 6.4 moles of carbon dioxide had been introduced. At this point the electrolyte was all in and the sodium silicate solution was noticed to have the slight blue hue indicating the initial appearance of the Tyndall effect. The feeding of carbon dioxide was continued at a rate of 1 mole in about 18 minutes and by 450 minutes, 24 moles of carbon dioxide had been introduced and the acidulation had progressed to 120%. See Table X for the acidulation rates. The reaction was now terminated and the silica slurry cooled and filtered. The silica product was treated with dilute aluminum sulfate to a pH of below 4.5, filtered, dried and micropulverized.

TABLE X.—SILICA PREPARATION FROM $Na_2O(SiO_2)_{3.22}$ (20 MOLES) AT 80° C.

| Time Cumulative (minutes) | Sodium Chloride Cumulative (moles) | Carbon Dioxide Cumulative (moles) |
|---|---|---|
| 0 | 0 | |
| 30 | 2.5 | 1.7 |
| 60 | 5.0 | 3.2 |
| 90 | 7.5 | 4.7 |
| [1] 120 | 10.0 | 6.4 |
| 150 | | 8.1 |
| [2] 165 | | 8.9 |
| 180 | | 9.6 |
| 210 | | 10.8 |
| 240 | | 12.8 |
| 270 | | 14.5 |
| 300 | | 16.0 |
| 330 | | 17.7 |
| 360 | | 19.2 |
| 375 | | 20.0 |
| 390 | | 20.6 |
| 420 | | 22.1 |
| 450 | | 24.0 |

[1] Initial Tyndall effect.
[2] Beginning of silica precipitation.

*Example 6*

This example was carried out in a manner similar to Example 5 except that the non-acidulating electrolyte was added at once after that period in the acidulation of sodium silicate with carbon dioxide had been reached when the Tyndall effect first became noticeable.

In this example 14,065 grams (20 moles $Na_2O(SiO_2)_2$) of 41° Bé. commercial sodium silicate was dissolved in 76 liters of water and placed in a stainless steel reactor agitated by a propeller type stirrer. The reactor and sodium silicate solution were heated to 80° C. and so maintained.

Through a tube reaching to the bottom of the reactor carbon dioxide was allowed to flow into the agitated sodium silicate solution at a relatively constant rate so that after 120 minutes 6.6 moles of carbon dioxide had been introduced and the sodium silicate solution took on the blue Tyndall effect color.

The non-acidulating electrolyte solution which had been prepared by dissolving 10 moles of sodium chloride in 2 liters of water, was now added to the partially acidulated sodium silicate. The flow of carbon dioxide was continued at the same relatively constant rate (see Table XI). After a total reaction time of 180 minutes a total of 9.6 moles of carbon dioxide had been added and the precipitation of silica had commenced. After 465 minutes 25 moles of carbon dioxide had been added, and the reaction was terminated. See Table XI for details of rates of addition of carbon dioxide.

The silica material was cooled, filtered and washed until the soluble salt content was in the range of 1 to 2% by weight (based on silica).

The washed silica material was treated with aluminum sulfate until a pH of 4.5 was attained. The resulting silica product was filtered and washed, then dried at 105° C. and micropulverized.

TABLE XI.—SILICA PREPARATION FROM $Na_2O(SiO_2)_{3.22}$ (20 MOLES) AT 80° C.

| Time Cumulative (minutes) | Sodium Chloride Cumulative (moles) | Carbon Dioxide Cumulative (moles) |
|---|---|---|
| 0 | | 0 |
| 30 | | 1.5 |
| 60 | | 3.0 |
| 90 | | 4.7 |
| [1] 120 | 10 | 6.6 |
| 150 | | 7.8 |
| [2] 180 | | 9.6 |
| 210 | | 10.8 |
| 240 | | 12.7 |
| 270 | | 14.5 |
| 300 | | 16.3 |
| 330 | | 17.4 |
| 360 | | 19.4 |
| 375 | | 20.0 |
| 420 | | 22.5 |
| 450 | | 24.0 |
| 465 | | 25.0 |

[1] Initial Tyndall effect.
[2] Beginning of silica precipitation.

*Example 7 (comparative example)*

This silica was prepared exactly like the silica of Example 5 except that the sodium chloride electrolyte solution was added to the reactor prior to initiating of the carbon dioxide feed.

The reactor charge thus consisted of 14,065 grams of commercial 41° Bé. sodium silicate $$(20 \text{ moles } Na_2O(SiO_2)_{3.22})$$

and 10 moles of sodium chloride dissolved in 78 liters of water. After these ingredients had thoroughly mixed and the temperature thereof raised to 80° C. the carbon dioxide feed was started. As in the previous examples, carbon dioxide was fed at a rate of 1 mole about every 18 minutes. At 455 minutes the reaction was complete, 24 moles of carbon dioxide having been fed in which was equivalent to an acidification of 120%. See Table XII for the rates of acidulation. The product was cooled and filtered and the silica filter cake was slurried in water and treated with aluminum sulfate to a pH of 4.5, filtered, dried at 105° C. and micropulverized.

TABLE XII.—SILICA PREPARATION FROM $Na_2O(SiO_2)_{3.22}$ (20 MOLES) AT 80° C.

| Time Cumulative (minutes) | Sodium Chloride (moles) | Carbon Dioxide Cumulative (moles) |
|---|---|---|
| 0 | 10 | 0 |
| 30 | | 1.8 |
| 60 | | 3.1 |
| 90 | | 4.6 |
| 105 | | 5.5 |
| [1] 120 | | 6.7 |
| 150 | | 7.9 |
| 180 | | 9.5 |
| [2] 186 | | 9.7 |
| 210 | | 11.0 |
| 240 | | 12.3 |
| 270 | | 14.1 |
| 300 | | 15.6 |
| 330 | | 17.2 |
| 360 | | 18.9 |
| 390 | | 20.2 |
| 410 | | 22.0 |
| 440 | | 23.3 |
| 455 | | 24.2 |

[1] Initial Tyndall effect.
[2] Beginning of silica precipitation.

The silicas of Examples 5, 6 and comparative Example 7 were compounded in SBR-1502 according to the recipe given in Table VIII. The test results are set forth in Table XIII. It is to be noted that the silicas prepared according to Examples 5 and 6 were improvements over the silica of the comparative Example 7.

TABLE XIII.—COMPARATIVE EVALUATION

| Example No. | 5 | 6 | Comparative 7 |
|---|---|---|---|
| $x$ value when electrolyte added | 3.22–4.7 (Range) | 4.8 | 3.22 |
| $x$ value when Tyndall Effect appeared | 4.7 | 4.8 | 4.4 |
| $x$ value when precipitate appeared | 5.9 | 6.2 | 6.2 |
| Bulk density of micropulverized silica (g./ml.) | 0.067 | 0.067 | 0.063 |
| Vulcanizate Compound No. AR— | 2466 | 2465 | 2463 |
| Physical data: | | | |
| Hardness (Shore A) | 59 | 65 | 58 |
| Modulus 300% (p.s.i.) | 710 | 650 | 810 |
| Tensile at Break (p.s.i.) | 3,290 | 3,760 | 3,030 |
| Elongation at Break (percent) | 670 | 690 | 640 |

*Example 8*

This example was carried out exactly like Example 6 except that the 10 moles of sodium chloride dissolved in water were added at 270 minutes when the cumulative total moles of carbon dioxide added was 14.5 moles, instead of at the time of appearance of the Tyndall effect. The resulting silica product showed good flocculation and improved filtering properties, notwithstanding that the primary particles and network aggregates had been formed in the absence of nonacidifying electrolyte.

While there have been described herein what are at present considered preferred embodiments of the invention, it will be obvious to those skilled in the art that minor modifications and changes may be made without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

We claim:

1. In the preparation of silica pigment by the gradual acidulation of an aqueous solution of alkali metal silicate with the aid of carbon dioxide and non-acidulating electrolyte, the improvement which consists essentially in adding non-acidulating electrolyte to the solution during that part of the period in the acidulation thereof in which the value of $x$ in the composition of the alkali metal silicate designated by the formula $M_2O(SiO_2)_x$—wherein M is alkali metal—has become greater than 3.75; said non-acidulating electrolyte being selected from the group consisting of the alkali metal halides and sulfates and being added in the proportion of from 0.01 to 1.0 mole per mole of silica present, designated as $SiO_2$, and continuing the carbon dioxide acidulation until precipitation of the pigment has been completed.

2. In the preparation of silica pigment by the gradual acidulation of an aqueous solution of alkali metal silicate with the aid of carbon dioxide and non-acidulating electrolyte, the improvement which consists essentially in adding non-acidulating electrolyte to the solution during that part of the period in the acidulation thereof in which the value of $x$ in the composition of the alkali metal silicate designated by the formula $M_2O(SiO_2)_x$—wherein M is alkali metal—has become greater than 4.2; said non-acidulating electrolyte selected from the group consisting of the alkali metal halides and sulfates and being added in the proportions of from 0.01 to 1.0 mole per mole of silica present, designated as $SiO_2$, and continuing the carbon dioxide acidulation until precipitation of the pigment has been completed.

3. In the preparation of silica pigment by the gradual acidulation of an aqueous solution of alkali metal silicate with the aid of carbon dioxide and non-acidulating electrolyte, the improvement which consists essentially in adding non-acidulating electrolyte to the solution during that part of the period in the acidulation thereof in which the precipitation of the silica has become substantially complete; said non-acidulating electrolyte being selected from the group consisting of the alkali metal halides and sulfates and being added in the proportion of from 0.01 to 1.0 mole per mole of silica present, designated as $SiO_2$, and continuing the carbon dioxide acidulation until precipitation of the pigment has been completed.

4. In the preparation of silica pigment by the gradual acidulation of an aqueous solution of alkali metal silicate with the aid of carbon dioxide and non-acidulating electrolyte, the improvement which consists essentially in adding non-acidulating electrolyte to the solution during that part of the period in the acidulation thereof in which the value of $x$ in the composition of the alkali metal silicate designated by the formula $M_2O(SiO_2)_x$—wherein M is alkali metal—has become greater than 3.75; said non-acidulating electrolyte being a solution of an alkali metal salt of a mineral acid selected from the group consisting of the alkali metal halides and sulfates, having a normality greater than that of the alkali metal silicate solution, and being added in the proportion of from 0.01 to 1.0 mole per mole of silica present, designated as $SiO_2$, and continuing the carbon dioxide acidulation until precipitation of the pigment has been completed.

5. In the preparation of silica pigment by the gradual acidulation of an aqueous solution of alkali metal silicate with the aid of carbon dioxide and a non-acidulating electrolyte, the improvement which consists essentially in adding non-acidulating electrolyte to the solution during that part of the period in the acidulation thereof in which the value of $x$ in the composition of the alkali metal silicate designated by the formula $M_2O(SiO_2)_2$—wherein M is alkali metal—has become greater than 4.2; said non-acidulating electrolyte being a solution of an alkali metal salt of a mineral acid selected from the group consisting of the alkali metal halides and sulfates, having a normality greater than that of the alkali metal silicate solution, and being added in the proportion of 0.01 to 1.0 mole per mole of silica present, designated as $SiO_2$, and continuing the carbon dioxide acidulation until precipitation of the pigment has been completed.

6. In the preparation of silica pigment by the gradual acidulation of an aqueous solution of alkali metal silicate with the aid of carbon dioxide and non-acidulating electrolyte, the improvement which consists essentially in adding non-acidulating electrolyte to the solution during that part of the period in the acidulation thereof in which the precipitation of the silica has become substantially complete; said non-acidulating electrolyte being a solution of an alkali metal salt of a mineral acid selected from the group consisting of the alkali metal halides and sulfates, having a normality greater than that of the alkali metal silicate solution, and being added in the proportion of from 0.01 to 1.0 mole per mole of silica present, designated as $SiO_2$, and continuing the carbon dioxide acidulation until precipitation of the pigment has been completed.

7. The invention of claim 1, wherein the addition of non-acidulating electrolyte is terminated before the value of $x$ reaches 5.3.

8. The invention of claim 1, wherein the addition of non-acidulating electrolyte is terminated on the appearance of a Tyndall effect.

9. The invention of claim 1, wherein addition of non-acidulating electrolyte is terminated when the precipitation of the silica has become substantially complete.

10. The invention of claim 2, wherein the addition of non-acidulating electrolyte is initiated on the appearance of a Tyndall effect.

11. The invention of claim 10, wherein the addition of non-acidulating electrolyte is terminated when the precipitation of the silica has become substantially complete.

12. The invention of claim 1, wherein the alkali metal silicate is sodium silicate and the non-acidulating electrolyte added is sodium chloride.

13. The invention of claim 2, wherein the alkali metal silicate is sodium silicate and the non-acidulating electrolyte added is sodium chloride.

14. The invention of claim 3, wherein the alkali metal silicate is sodium silicate and the non-acidulating electrolyte added is sodium chloride.

15. The invention of claim 1, practiced as a continuous process wherein the acidulation is applied to moieties of the alkali metal silicate solution in a series of zones, and the addition of non-acidulating electrolyte is effected in less than all of said zones.

16. The invention of claim 1, wherein the non-acidulating electrolyte is added in aqueous solution to the solution of alkali metal silicate, at least during that period in the acidification thereof in which the value of $x$ is changing from 3.75 to 5.3.

17. The invention of claim 1, wherein the non-acidulating electrolyte is added in aqueous solution to the solution of alkali metal silicate only after the value of $x$ exceeds 3.75.

References Cited

UNITED STATES PATENTS

| | | | |
|---|---|---|---|
| 2,392,767 | 1/1946 | Robinson | 23—182 |
| 2,940,830 | 6/1960 | Thornhill | 23—182 |
| 3,034,913 | 5/1962 | Lagerstrom | 106—306 |
| 3,108,892 | 10/1963 | Krinov | 106—306 |
| 3,202,525 | 8/1965 | Burk et al. | 106—306 |
| 3,208,823 | 9/1965 | Baker et al. | 23—182 |

OTHER REFERENCES

Vail: Soluble Silicates: Their Properties and Uses, vol. 1 (1952), p. 168.

OSCAR R. VERTIZ, *Primary Examiner.*

MAURICE A. BRINDISI, *Examiner.*

H. S. MILLER, R. M. DAVIDSON, A. GREIF,
*Assistant Examiners.*